Dec. 15, 1959   G. ARRAS   2,917,620
FIXTURE CONNECTION
Filed Dec. 14, 1955   2 Sheets-Sheet 1
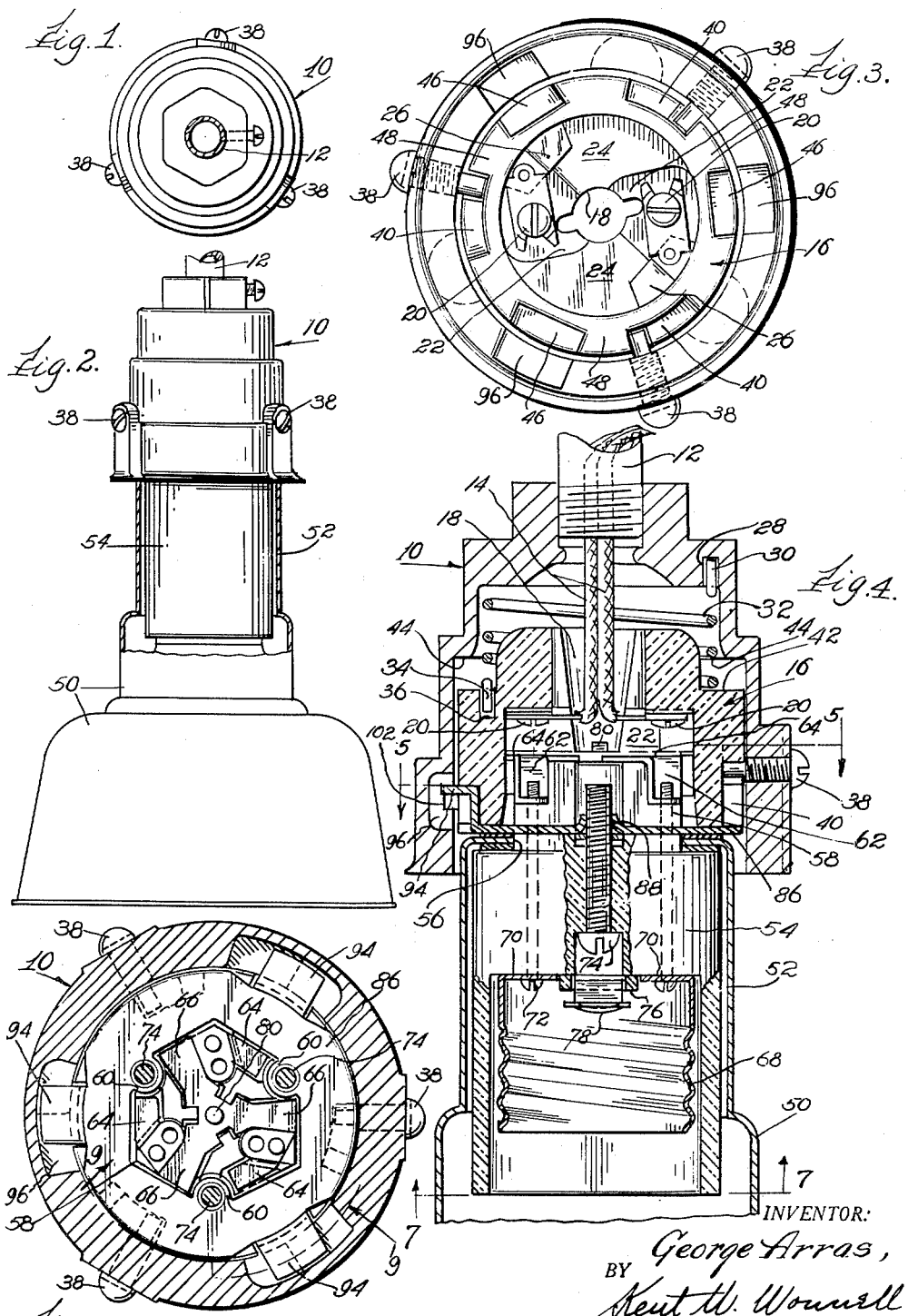
INVENTOR:
George Arras,
BY Kent W. Wonnell
Attorney.

Dec. 15, 1959 G. ARRAS 2,917,620
FIXTURE CONNECTION
Filed Dec. 14, 1955 2 Sheets-Sheet 2
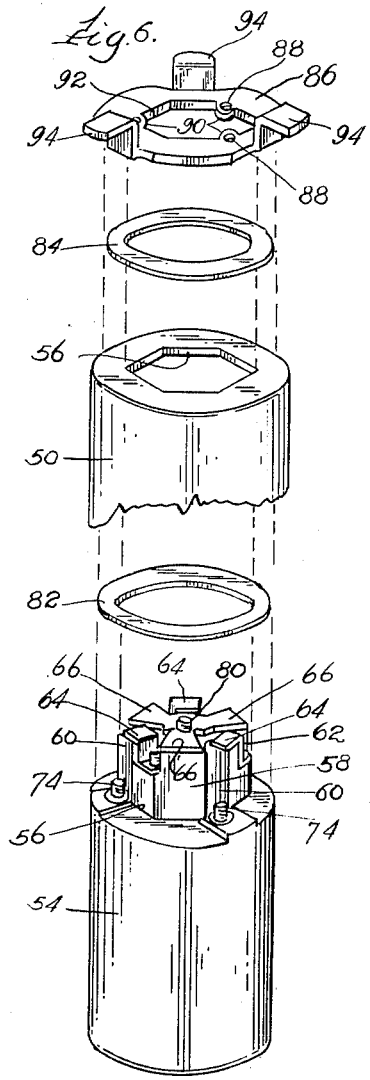
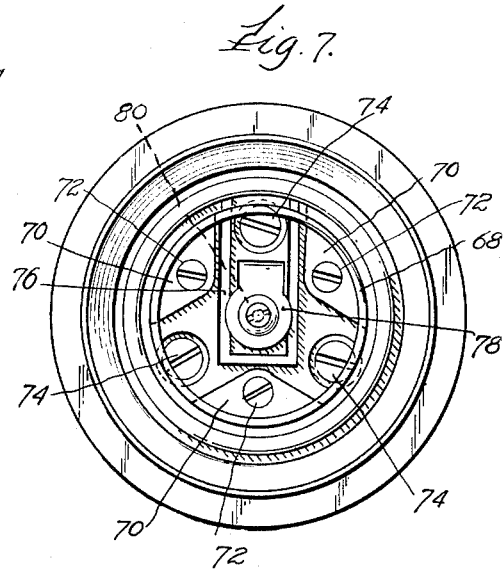
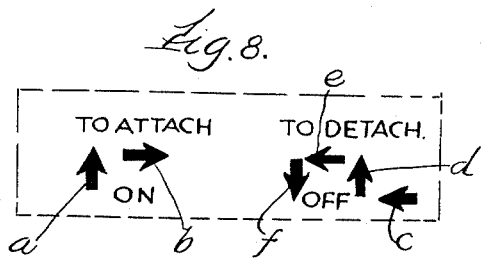
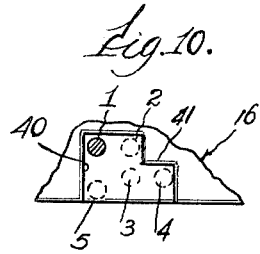
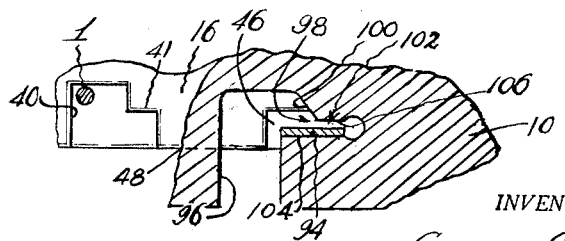
INVENTOR:
George Arras.
BY
Kent W. Wonnell
Attorney.

United States Patent Office 2,917,620
Patented Dec. 15, 1959

2,917,620

FIXTURE CONNECTION

George Arras, Chicago, Ill.

Application December 14, 1955, Serial No. 553,038

13 Claims. (Cl. 240—78)

This invention relates in general to a mechanical connection for tubular or hollow fixtures and is more particularly described as an electric fixture connection for mounting and disconnecting a reflector or shade by means of a lamp supporting socket which is attachable to a supporting casing.

In other disconnecting units, the parts are held together by spring pressure and there is no instantaneous make and break connection between electrical parts so that they must be installed with the current off or dangerous pitting of the contacts will result.

Another objection to previous units of this kind is that they do not have standard reflector hole connections and require special equipment.

An important object of the invention is to provide a spring connector for making instantaneous contacts but one which does not require the spring pressure for maintaining the mechanical connection between the parts.

Another object of the invention is to provide a mechanical connection which must be applied and removed in certain definite sequences in order to attach and detach the parts.

A still further object of the invention is to provide an electrical connecting fixture in which proper polarity of connection is maintained between the connected parts regardless of the angle of the contact.

Still a further object of the invention is to provide a removable fixture connection which is adapted to utilize standard fixtures thus eliminating the necessity of special fixtures.

Other objects of the invention will appear in the specification and will be apparent from the accompanying drawings in which Fig. 1 is a top plan view and Fig. 2 is a vertical elevational view partly in section of a fixture connection in accordance with this invention.

Fig. 3 is a bottom view of the supporting unit shown in Fig. 2 in disconnected position under spring torque and compression tension.

Fig. 4 is a longitudinal sectional view of the connecting structures of Fig. 2.

Fig. 5 is a detail sectional view taken on the line 5—5 of Fig. 4.

Fig. 6 is an exploded view of a socket and the parts connected thereto.

Fig. 7 is a sectional plan view looking upward on the line 7—7 of Fig. 4.

Fig. 8 is an instruction chart showing the relative movements in connecting and disconnecting the parts.

Fig. 9 is a sectional view taken on line 9—9 of Fig. 5 showing one projection in locked position; and Fig. 10 is a diagrammatic view indicating the relative attaching and detaching positions of the engaging projections in one of the hood porcelain openings in accordance with Fig. 8.

In ordinary connection units, it is usually sufficient to insert one part within the other against a compression spring and to give one of the parts a partial turn in one direction. To disconnect the parts, the turning action is reversed and the spring separates the parts.

With this construction, the connection between the parts is maintained by the spring and usually a large and heavy spring is required. These objections are overcome in the present construction by using a relatively light spring and by relatively rotating the parts to connect them, but requiring a longitudinal movement in addition to a rotary movement to disconnect the parts.

Referring now more particularly to the drawings, a supporting hood 10 is preferably a hollow metal casting and threaded at the top to receive a supporting pipe 12 through which electrical conductors 14 extend to the inside of the hood.

At the inside of the casting 10 is a wiring porcelain base hood 16 with an end opening 18 through which the conductors 14 extend for engagement by fastening screws 20. These screws are located in recesses 22 at the bottom of a central recess within the porcelain, and connected to the screws and extending outwardly from the recesses with bent portions located upon ledges 24 at the sides of the recesses 22 are contact terminals 26 for the separate conductors 14.

In the bottom of the hood casting 10 is a hole 28 for receiving a bent extremity 30 of a coil spring 32, the other end of which has a bent extremity 34 engaging in a hole 36 of the porcelain 16 so that when it is inserted within the casting 10, it is given a slight twist to place the spring 32 partially under torque tension and also under compression. In order to hold the porcelain hood 16 against rotary and outward movement from the hood casting 10 due to the spring 32, stud screws 38 are inserted through the wall of the casting and into the path of openings 40 in the outer wall of the porcelain hood 16 extending from the adjacent edge thereof and at equal distances apart around the periphery to register with the screws 38 so that after the porcelain hood is inserted against the combined compression and torque tension of the spring 32, and the screws are inserted through the wall of the casting 10 engaging in the recesses 40, the porcelain will be limited in its movement outwardly in the hood casting by engagement of the screws, but may be pressed inwardly a limited amount until an outside shoulder 42 of the porcelain engages an inside shoulder 44 of the casting and may also be rotated a limited amount against the torque of the spring 32.

Intermediate the openings 40 in the outer side of the porcelain hood wall are other recesses 46 in the edge of the porcelain, one diametrically opposite each of the three openings 40 so that partitions 48 in the outer rim are located at approximately the same distance apart as the openings 40 and the recesses 46.

A reflector 50 has a reduced neck 52 for receiving a porcelain lamp socket 54 in the reduced neck 52 and the extremity of the neck is formed with a hexagonal opening 56 through which a corresponding hexagonal projection 58 at the end of the lamp socket is inserted. At three equi-distant angular edges around the hexagonal projection 58 are rounded recesses 60 and intermediate these recesses at the end of the projection 58 are angular recesses 62 for seating a Z-shaped contact 64 having one extremity seated in the recess 62 and the other extremity at the outer end of the projection 58.

At the end of the projection 58 is a center triple contact 66 having three arms to extend against the end of the projection 58 and between the contacts 64. With this arrangement having three spaced contacts 64 and the three arms of the center triple contact 66, one arm of the triple contact and one of the Z-shaped contact 64 will be located at opposite sides of the projection 58 for engagement with opposite contacts 26 of the hood porcelain 16, no matter which one of the arms and contacts is considered.

Within the porcelain socket 54 is a threaded conductor shell 68 for receiving an electric lamp and this shell has inwardly extending ears 70 at its face through which screws 72 are inserted, each screw extending through the porcelain socket toward the end thereof and engaging that portion of one of the Z-shaped contacts 64 which is seated in the corresponding angular recess 62, thereby forming an electrical connection between the shell 68 and each one of the contacts 64.

Also extending through suitable openings in the bottom of the porcelain socket 54 and free from engagement with shell 68 are screws 74 adapted to be partially seated in the rounded recesses 60 around the hexagonal projection 58 as they project through the bottom of the socket.

At the center of the socket and seated in a shallow walled frame 76 of porcelain is a resilient central contact 78 for engaging the center contact at the end of an incandescent lamp which is inserted in the socket in a well known manner, this contact being bent upon itself with one spring leaf protruding from the shallow frame 76 to form a spring contact engagement and another leaf portion being seated in the frame 76 by inserting a fastening screw 80 through this other leaf of the contact 78, the end of this screw extending through the central portion of the bottom of the lamp socket 54 and engaging the triple contact 66 at the outer end of the projection 58. Thus the socket shell and its different contact parts are firmly connected together in proper insulating relation with respect to each other.

The lamp socket 54 is assembled in the neck 52 of a reflector 50 by inserting the hexagonal projection 58 through the hexagonal opening 56 but first interposing a non-conducting washer 82 between them and surrounding the screws 74, applying another non-conducting washer 84 of fiber or similar material at the outside of the end of the reflector surrounding the screws 74. A supporting plate 86 is then applied which has threaded openings 88 in rounded projections 90 extending inwardly in a hexagonal opening at the center of the plate so that the ends of the screws 74 may be inserted through the threaded openings 88 drawing these assembled parts tightly in place surrounding the projection 58 at the end of the socket. The rounded projections 90 are adapted to extend inwardly in the rounded recesses 60 of the projection 58, thereby holding the assembled parts tightly in position when the ends of the screws 74 are inserted therethrough.

Extending lengthwise of the socket 54 and then outwardly from the supporting plate 86 are three rigid flat projections 94 preferably formed integral with the plate and at equi-distant locations at the outside periphery. These projections extend outwardly beyond the outer surfaces of the neck 52 of the reflector 50 and the projecting ends are adapted to be received through correspondingly spaced recesses 96 opening from the outer edge of the inner periphery of the supporting hood 10 and also the connecting lengthwise portions of the projections being seated within the recesses 46 in the outer edge of the porcelain hood 16. When the reflector and socket assembly is rotated in the casting 10, the projections 94 being forcibly rejected by the spring 32, the recesses 46 and 96 are brought to register with each other as shown in Fig. 3 in separating the socket from the hood casting 10.

In order to rotate the reflector and socket assembly within the casting 10, each recess 96 has a lateral extension 98 therefrom at the bottom and one side of the recess 96 extending in a clockwise direction as viewed from the open end of the casting 10 with an angular wall 100 terminating in a reduced passage 102 having opposite straight walls 104 and 106 into which the extremity of any projection 94 may be moved.

To install this fixture connection, the hood casting 10 is connected at any desired location by pipe 12 with conductor supply wires such as 14 leading to the fastening screws 20 in the bottom of the hood casting. A lamp may be secured in the reflector socket assembly and the unit is ready for connection by a customer.

To apply and remove the reflector are simple operations as indicated by the instruction chart of Fig. 8 which may be in the form of a label applied either to the reflector or to the hood casting or to both of them. In the connecting operation, the three projections 94 of the supporting plates 86 are inserted in the three recesses 96 of the hood casting 10 and the three projections then ride on the outer surfaces of the projections 48 in the outer rim of the porcelain hood. Inward pressure is then applied against the spring 32 until the three projections can be turned in a clockwise direction from the recesses 96 into the side reduced passages 102.

Upon engagement of the projection 94 with the surfaces of the projections 48, the contacts 26 on the hood porcelain 16 and contacts 64 and 66 of the porcelain lamp socket 54 do not touch. The retaining stud screws 38 are moved from position 1 to position 5 relative to the porcelain hood as shown in Fig. 10. This position is very important as it prevents arcing between the contacts. The reflector 50 with the attached supporting plate 86 which has the three rigid projections 94 is then turned in a clockwise direction relative to the projections 48 in the outer rim of the hood portion 16 until the socket projections 94 register with the recesses 46 in the outer wall of the porcelain hood 16 whereupon the hood portion will spring outwardly under the compression of the spring 32 seating the longitudinal portions of the projections 94 in the recesses 46 of the hood porcelain 16.

At this time an instantaneous contact is made between one of the opposite terminals 26 of the porcelain hood and two opposite contacts 64 and between the other terminal 26 and one arm of the triple contacts 66 of the lamp socket 54. The retaining stud screws 38 are in position 1 as shown in Fig. 10. The label represented in Fig. 8, at the left side shows an arrow *a* indicating the relatively inward pressure and another arrow *b* indicating the lateral movement to the right which are the only movements required for connecting the parts. The three projections 94 are now supported in the reduced passages 102 having opposite straight walls 104 and 106 preferably machined surfaces so that the ends of the projections 94 have very little movement transversely of the passage 102. The pressure of spring 32 at this time maintains electrical contact between the conductors of the porcelain hood 16 and the lamp socket 54.

To remove the lamp socket 54 and the reflector from the porcelain hood, they must be turned relatively counter-clockwise together since the longitudinal portions of the projections 94 are now seated in the recesses 46 of the porcelain hood 16, until the retaining stud screws 38 are in position 2 relative to the hood porcelain as shown in Fig. 10 in engagement with a shoulder 41 in recess 40. This action increases the torque of the spring 32. If the reflector is now released, it would return to its original position due to the torque of the spring, so the next step is to further insert the reflector slightly inward against the compression of the spring 32 until the screws 38 are in position 3 relatively outward from the shoulder 41. By now continuing to turn the reflector counter-clockwise a few degrees until the retaining screws 38 are in position 4 as shown in Fig. 10, the projections 94 are now directly in line with the recesses 96 of the hood casting as shown in Fig. 3. If the reflector is now released by moving the projections out through the casting recesses 96, the torque action of the spring returns the porcelain hood 16 to the locking position. With the reflector and socket 54 in this counter clockwise position as represented by position 4 in Fig. 10, the projections 94 are then pulled straight out, the spring being compressed assisting the separation of the lamp socket in a snap action from the porcelain hood causing a quick break. The three projections 94 are released from the hood notches 96 and porcelain hood recesses 46 and the torque action of the spring 32 will return the porcelain hood to its original position with the retaining screws 38 in position #1 as shown in Fig. 10.

The instruction chart of Fig. 8 also illustrates the necessary "off" movement as above described in which the combined reflector and socket are moved as a unit in a counter-clockwise direction as indicated by the arrow c until the screws 38 move in the recess 40 from position 1 to position 2 as shown in Fig. 10. As the screws now engage the shoulder 41, the reflector unit is moved inwardly as indicated by the arrow d until the screws 38 take the position 3; as the porcelain hood 16 now engages its shoulders 42 with inside shoulders 44 of the casting 10, the inward movement indicated by the arrow d is limited and is represented by the movement of the screws 38 in Fig. 10 from position 2 to position 3. The next movement as indicated by the reflector unit is indicated by the arrow e in Fig. 8 in a clockwise direction which represents the movement of the screws 38 in Fig. 10 from the position 3 to the position 4. At this time, the recesses 40 of the hood porcelain have been moved by the engagement of the projections 94 so that they register with the inner recesses 96 of the hood casting 10 and the projections 94 may then be pulled outwardly as indicated by the arrow f in Fig. 8 from the position 4 to which the unit has been moved from the position 3.

After the removal of the reflector unit, the spring 32 returns the hood casting in a clockwise direction from position 4 to position 1 and at this time the contact surfaces of the projections 48 will again be directly in line with the recesses 96 of the hood casting so that the reflector is to be again installed, the applying action will be repeated as above described.

With this construction, a reflector and a lamp socket are firmly attached to the hood casting and there is a snap action of the parts both to bring the electrical conductors of the lamp socket and the porcelain hood together and also to separate them when the reflector is removed. When the hood casting is firmly supported in place, the reflector and lamp socket may be easily attached with one hand since the attaching and removing operation of the reflector are relative to the hood casting in the sequence as shown and described. The lamp socket once inserted is not easily removed by vibration, shaking or swinging, it remains firmly in place until it is positively removed by the removal action as above set forth.

While a preferred construction has been described in some detail, it should be regarded as an illustration or example rather than as a limitation or restriction of the invention, since various changes in the construction, combination and arrangement of the parts may be made without departing from the spirit and scope of the invention.

I claim:

1. In a fixture connection, the combination with an open ended hood having spaced recesses in its inner peripheral edge with a lateral extension from the same corresponding side of each recess, a wiring base seated in the hood having spaced recesses in its outer periphery, inward projections extending from the hood into the recesses of the wiring base to permit a limited movement of the base relative to the hood, a spring interposed between the inside of the hood and the base tending to press the latter outwardly against the said projections and to maintain it relatively turned in the hood in one direction, the base having other intermediate recesses in the outer periphery to register with said recesses at the inner periphery of the hood and the base having partitions between the recesses extending to the outer face of the base, and a connector insertable in the open end of the hood having rigid projections outwardly therefrom and adapted to be inserted jointly into the recesses of the hood against the outer face of the base pressed outwardly by the spring and the projections of the connector being rotatable into the lateral extensions of the hood recesses until these projections register with the intermediate other recesses of the base.

2. In a fixture connection in accordance with claim 1, the outer face of the connector havng contacts held out of engagement with corresponding contacts on the outer face of the base until the projections of the connector are rotated to register with the said other recesses of the base and the spring pressing the face of the base in a snap movement against the outer end of the connector as soon as the connector projections register with the intermediate outer recesses of the base and the connector being then locked against said base in an endwise direction.

3. In a fixture connection in accordance with claim 1, the hood recesses in the inner peripheral edge having a portion deeper than the depth of the said other recesses in the base and the base also having a shoulder at the relatively inner and clockwise directioned end of the said spaced recesses substantially as deep as the said intermediate recesses, the said spaced recesses limiting the rotational and endwise movements of the wiring base in the hood to the shape of the said shouldered recesses.

4. In a fixture connection in accordance with claim 3, the ends of the connector projections being thin and flat and the lateral extensions of the spaced recesses of the hood being relatively narrow but sufficient in width to receive the projections of the connector, and the intermediate recesses of the wiring base engage the projections of the connector in the narrow lateral extensions against relative rotative movement in either direction as limited by the engagement of the hood projections with said shoulders in the recesses.

5. In a fixture connection in accordance with claim 3, the projections of the connector when engaged in the lateral extensions from the hood recesses being rotatable for disengagement to a limited extent in a counter-clockwise direction but not sufficient to free the connector projections for removal from the recesses of the hood, the spaced recesses of the base permitting an inward movement of the connector into the hood to free the hood projections from the shoulders, the connector then being further rotatable so that the said connector projections register with the full width of the recesses of the hood and intermediate recesses of the base and the spring in the hood thereupon operates to forcibly actuate the hood wiring base until the hood projections engage in the bottoms of the base recesses and thereby forcibly expelling the connector projections and the connector from the hood.

6. An electrical fixture connection in accordance with claim 3 in which the inside of the hood wiring base has spaced electrical contacts and the connector has spaced electrical contacts at its inner end, the spacing of the contacts in the base and on the connector being such that they are spaced apart until the connector projections are seated in the said intermediate recesses of the wiring base and then are joined by the snap action of the spring.

7. In an electrical fixture connection in accordance with claim 6, the spaced recesses of the hood being three in number, the opposite contacts of the hood wiring base being two in number, the contacts of the connector comprising a central conductor with three radiating arms and three separate conductors at the periphery between the arms, the separate conductors being opposite the connector projections and one of the contacts in the base being opposite one of the first said spaced recesses in the outer periphery and the other contact being adjacent the opposite intermediate outer recess of the base to insure electrical connections between the base and the projector contacts in any one of the three positions possible by inserting the connector projections for engagement with the hood.

8. In an electrical fixture connection in accordance with claim 6, the connector including an insulating socket member with a lamp socket therein connected to the said electrical contacts, a reflector for a lamp in this socket, the reflector and lamp socket when attached by the connector being insertable in the open end of the hood and the connector being relatively flat requiring insertion against the hood spring only to a portion of the depth of the spaced recesses at the inside of the hood and then a rotating movement in a clockwise direction only to the extent of engaging the connector projections in the lateral extensions from the inner spaced recesses of the hood.

9. In an electrical fixture connection in accordance with claim 8, the recesses of the wiring base of the hood requiring a rotation of the connector for removal from the hood in a counter clockwise direction to move the base so that the hood projections are engaged with the corresponding recesses of the base, the connector and its projections being comparatively flat relative to the recess and depressible into the spaced recesses of the hood against the pressure of the hood spring until the hood projections are relatively outside of the shoulders of the spaced recesses of the wiring base and the connector with the projections being then further rotatable in a counter clockwise direction to position the wiring base so that its intermediate openings engaged by the connector projections are in line with the hood spaced recesses, the connector and its rigid projection being forcibly ejected by the hood spring and making a quick break of any electrical connections between the socket of the hood and a lamp socket in the connector.

10. In a fixture connection, the combination with a hood open at one end and having spaced recesses extending inwardly at its inner peripheral edge with a lateral restricted extension from the same corresponding side of each recess, a wiring base seated in the hood having recesses in its outer periphery spaced correspondingly to the recesses of the hood, projections extending from the hood into the recesses of the wiring base permitting a limited movement of the base axially and longitudinally of the hood, a spring interposed between the inside of the hood and the base tending to press it outwardly and against the projections and giving the base an axial tension to maintain it relatively turned in the hood in one direction, the base having intermediate recesses in the outer periphery spaced the same as the recesses in the inner periphery of the hood and the base having partitions between each pair of recesses extending to the outer face of the base, and a connector insertable in the open end of the hood having rigid projections outwardly therefrom adapted to be inserted jointly into the spaced recesses of the hood against the outer ends of the partitions of the base which is pressed outwardly by the spring, the inside of the hood wiring base having spaced electrical contacts and the inner end of the connector having corresponding electrical contacts, and the projections of the connector being rotatable into the lateral extensions of the hood recesses until these projections register with the intermediate outer recesses of the base.

11. In a fixture connection in accordance with claim 10, the connector projections extending longitudinally of the connector to engage in the said intermediate recesses and the ends extending outwardly to engage in the spaced recesses of the hood and in the lateral extensions thereof to lock the wiring base and the connector together during portions of their movements in joining and disconnecting the connector from the hood.

12. In a fixture connection in accordance with claim 1, the hood projections engaging in the wiring base recesses and the said recesses having shoulders therein which constitute lateral restrictions of the hood recesses, the connector projections being of such width with respect to the recesses that the connector is limited by said lateral restricted extensions of the hood recesses to a counter-clockwise movement in separating the connector from the hood, and the connector being movable as controlled by the hood projections into the shouldered wiring base recesses, first in a counter-clockwise direction and inwardly against the spring, then again counter-clockwise to bring the connector projections into register with the spaced hood recesses, the compression of the spring ejecting the connector and its projections from the hood with a snap action separating the connector from its engagement with the wiring base.

13. In a fixture connection, the combination with a hood open at one end and having spaced recesses at the inner peripheral edge of the open end each with a lateral thin recess at one side, a wiring base inserted in the open end of the hood having spaced recesses in its outer periphery, a spring having one end engaging the hood and the other end engaging the wiring base and the spring compressed between the hood and the base with an axial torsion tending to turn the base in the hood in one direction, projections extending from the hood to engage the recesses in the base to limit its outward and rotational movements, a connector insertable in the open end of the hood having spaced projections outwardly therefrom and adapted to be inserted into the recesses of the hood against the outer face of the wiring base and to press the base inwardly, the outer face of the wiring base having electrical contacts and the adjacent face of the connector having corresponding electrical contacts, and the connector projections being rotatable into the lateral extensions of the hood recesses and against the torsional and outward compression of the spring until the projections register with the said recesses of the base, whereupon the base will spring outwardly to engage the outer face thereof with the face of the connector and will lock the connector against reverse disengaging movement.

References Cited in the file of this patent

UNITED STATES PATENTS

| | | |
|---|---|---|
| 1,468,577 | Sanders | Sept. 18, 1923 |
| 2,015,715 | Doane | Oct. 1, 1935 |
| 2,127,124 | Litner | Aug. 16, 1938 |
| 2,264,687 | Winkler et al. | Dec. 2, 1941 |